United States Patent Office 3,401,044
Patented Sept. 10, 1968

3,401,044

CHEMICAL SENSITIZATION OF BACTERIAL SPORES TO RADIATION IN FOOD

Donald A. Corlett, Jr., Arthur W. Anderson, and Paul R. Elliker, Corvallis, Oreg., and Kenneth L. Krabbenhoft, Las Cruces, N. Mex., assignors, by mesne assignments, to The Battelle Development Corporation, Columbus, Ohio, a corporation of Delaware

No Drawing. Filed Aug. 26, 1965, Ser. No. 482,942
5 Claims. (Cl. 99—217)

ABSTRACT OF THE DISCLOSURE

Meat is sterilized and preserved using high energy ionizing radiation by introducing sodium chloride in combination with sodium nitrite or sodium nitrate into the meat prior to irradiation to render bacteria therein sensitive to a dose of ionizing radiation sufficient to sterilize the meat without destroying its natural characteristics.

This invention relates generally to the preservation of food products by irradiation and more particularly to the sensitization of bacterial spores to radiation in food products such as meat by addition of certain chemicals to the food prior to exposure to radiation.

It is well known that bacterial spores in food can be inactivated by exposure to ionizing radiation of the beta or gamma ray type at dosage levels in excess of about 1 megarad. Certain spores, however, require very high levels of radiation to be inactivated and at such magnitudes of radiation the food is rendered unpalatable. This is particularly true of food containing *Clostridium botulinum*, a heat-resistant, sporeforming organism which survives in many nonacid foods and produces a highly potent toxin. Raw ground beef, for example, inoculated with spores of *Clostridium botulinum* requires such a high dosage of gamma radiation for sterilization that the beef is no longer suitable as food.

Accordingly, it is a primary object of this invention to provide ways and means to lower the dose of radiation required to destroy bacterial spores in food products.

Another object of this invention is to provide a process for sterilizing food products by irradiation without destroying the natural characteristics of the food.

A more specific object of this invention is to provide a process for chemically sensitizing bacterial spores in food to reduced amounts of radiation such that the food can be sterilized by irradiation without becoming unpalatable.

Still another object is to provide a process for chemically sensitizing *Clostridium botulinum* spores in meat to lesser amounts of radiation such that the spores can be destroyed without rendering the meat unpalatable.

The invention is based upon the discovery that a combination of certain chemical additives effect the amount of radiation required to destroy bacterial spores in food products, thus enabling sterilization by irradiation while preserving the natural flavor, color, odor, texture and other desirable characteristics of the food.

In its broadest form the invention comprises a process for treating food products for preservation by high energy ionizing radiation comprising introducing sodium chloride in combination with sodium nitrite or sodum nitrate into the food to render any bacteria therein sensitive to a dose of ionizing radiation sufficient to sterilize said food without destroying its natural characteristics. Preferably, sufficient amounts of the additives should be employed to sensitize the bacteria to a degree such that a dose of ionizing radiation not exceeding 3 megarads is sufficient to sterilize the food.

The invention has particular application in the treatment of nonacid foods such as meat as the following example will illustrate.

Example

A series of test specimens were prepared from freshly ground round steak using various combinations of the following additives at the indicated levels with and without radiation: sodium chloride 2.5% by weight based on the weight of the food; sodium nitrate 1000 p.p.m.; sodium nitrite 200 p.p.m. Stock spore suspensions of *Clostridium botulinum* type 33–A were prepared using standard procedures and each test specimen inoculated with $10^6$ viable, heatshocked spores per gram and thoroughly mixed therewith. Portions of each specimen were packed into a series of cans, at least 25 or more replicates per specimen, the cans sealed and each subjected to 2.0, 2.5 and 3.0 megarads of gamma radiation. The irradiated samples thereafter were incubated at 35° C. until a hard swell developed and then opened and examined microscopically to determine whether spore growth had occurred. The presence of toxin was determined by mouse injection. If no hard swell occurred in 120 days the cans were opened and assayed also. Incubated samples from each can were injected intraperitoneally into white mice. Toxicity of the preparation was characterized by the typical symptoms of botulinum toxic poisoning followed by death. Lethal effects were observed for a period of 3 days.

Data showing the results obtained when various dosages of gamma radiation were used in conjunction with sodium chloride and either sodium nitrate or sodium nitrite are shown in Table 1. Data showing the results obtained when various dosages of gamma radiation were used with the additives singly are shown in Table 2.

TABLE 1

| Additive | Radiation dose (megarads) | Total cans | Swollen cans | Unswollen cans containing toxin | Unswollen cans and no toxin |
|---|---|---|---|---|---|
| None | 0 | 25 | 25 | ---- | ---- |
| | 2.0 | 25 | 25 | ---- | ---- |
| | 2.5 | 25 | 23 | 0 | 2 |
| | 3.0 | 25 | 15 | 0 | 10 |
| NaCl plus $NaNO_3$ | 0 | 25 | 25 | ---- | ---- |
| | 2.0 | 125 | 0 | 0 | 125 |
| | 2.5 | 25 | 0 | 0 | 25 |
| | 3.0 | 25 | 0 | 0 | 25 |
| NaCl plus $NaNO_2$ | 0 | 25 | 25 | ---- | ---- |
| | 2.0 | 125 | 1 | 5 | 119 |
| | 2.5 | 25 | 0 | 0 | 25 |
| | 3.0 | 25 | 0 | 0 | 25 |

TABLE 2

| Additive | Radiation dose (megarads) | Total cans | Swollen cans | Unswollen cans containing toxin | Unswollen cans and no toxin |
|---|---|---|---|---|---|
| $NaNO_3$ | 0 | 25 | 25 | ----- | ----- |
| | 2.0 | 25 | 5 | 20 | 0 |
| | 2.5 | 25 | 10 | 15 | 0 |
| | 3.0 | 25 | 1 | 24 | 0 |
| $NaNO_2$ | 0 | 25 | 25 | ----- | ----- |
| | 2.0 | 25 | 12 | 13 | 0 |
| | 2.5 | 25 | 13 | 12 | 0 |
| | 3.0 | 25 | 4 | 21 | 0 |
| NaCl | 0 | 10 | 10 | 00 | 00 |
| | 2.0 | 25 | 15 | 10 | 0 |

As Table 1 indicates, the combination of sodium chloride and sodium nitrate with any of the radiation dosages is effective in preventing hard swells. No mouse-lethal toxin could be demonstrated in these samples. The results obtained when sodium nitrite was substituted for sodium nitrate are similar. The data also reveals that the use of the combined additives above or irradiation alone is not effective in inactivating *Clostridium botulinum* spores or in preventing the development of hard swells. Furthermore, from the results shown in Table 2 it appears that the use of the various additives individually, in combination with gamma radiation, is not effective in inactivating the spores.

From the foregoing it will be apparent that combinations of either sodium nitrite or sodium nitrate with sodium chloride are effective in lowering the dose of gamma radiation necessary to destroy bacteria spores in foods. While the above example is concerned with a meat product, it should be understood that any food suspected of containing bacterial spores can be effectively treated with the combinations of additives to reduce the amount of radiation necessary for sterilization.

Obviously, many modifications and variations of the invention will be apparent to those skilled in the art without departing from the spirit and scope thereof, and accordingly, the invention is intended to be limited only to the extent set forth in the appended claims.

We claim:

1. A process for sensitizing bacteria in meat to reduced dosages of ionizing radiation during radiation sterilization comprising introducing into meat a mixture of sodium chloride and a compound selected from the group consisting of sodium nitrate and sodium nitrite in amounts sufficient to sensitize bacteria to ionizing radiation, said amounts of sodium chloride, sodium nitrate and sodium nitrite being at least 2.5% by weight based on the weight of the meat, 1000 p.p.m. of meat and 200 p.p.m. of meat, respectively, and thereafter irradiating said meat with a sufficient dose of ionizing radiation to destroy bacteria therein but insufficient to affect the natural characteristics of the meat.

2. The process according to claim 1 in which the bacteria sensitized is *Clostridium botulinum* spores.

3. The process according to claim 2 in which said dose of ionizing radiation does not exceed three megarads.

4. The process according to claim 2 in which said dose of radiation does not exceed 2.5 megarads.

5. The process according to claim 2 in which said dose of radiation does not exceed 2.0 megarads.

References Cited

UNITED STATES PATENTS 3,003,883 10/1961 Levy ---------- 99—159
3,093,489 7/1961 Alexander et al. ------ 99—217

OTHER REFERENCES

McCulloch, Disinfection and Sterilization, September 1948, pp. 173 to 174.

RAYMOND N. JONES, *Primary Examiner.*

S. B. DAVIS, *Assistant Examiner.*